Feb. 7, 1933.  G. BROWN  1,896,066
HUB CAP OR THE LIKE
Filed April 12, 1929
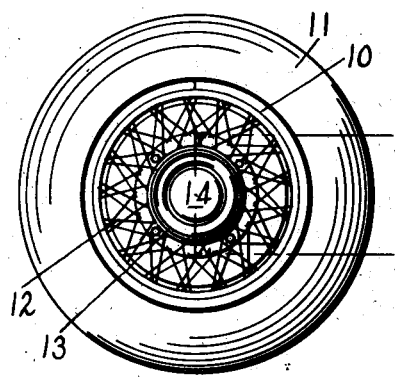
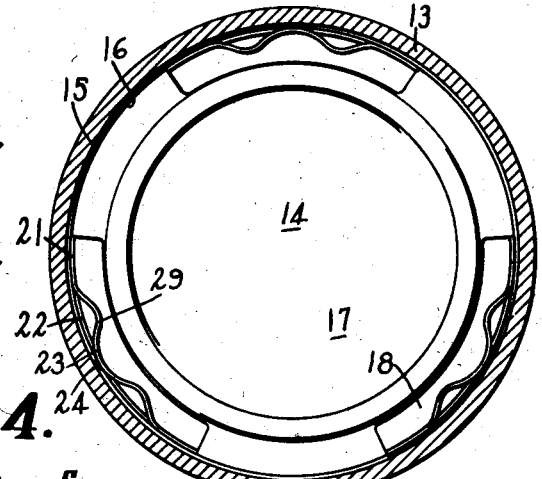
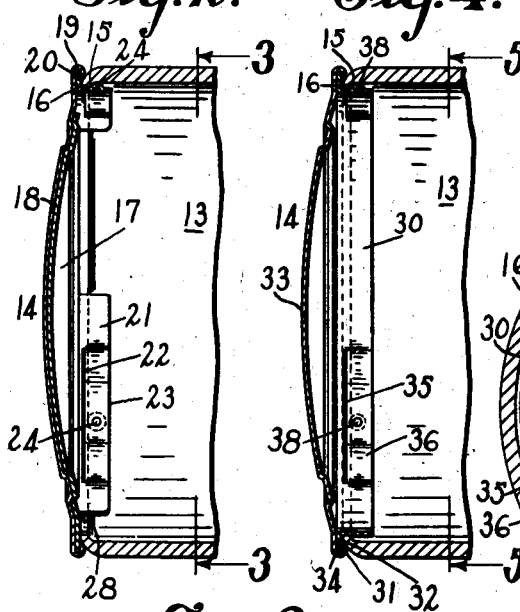
Inventor
Gregory Brown
By Rockwell & Bartholow
Attorneys Patented Feb. 7, 1933

1,896,066

UNITED STATES PATENT OFFICE

GREGORY BROWN, OF BRIDGEPORT, CONNECTICUT, ASSIGNOR TO BRIDGEPORT BRASS COMPANY, OF BRIDGEPORT, CONNECTICUT

HUB CAP OR THE LIKE

Application filed April 12, 1929. Serial No. 354,566.

This invention relates to a closure member such as a hub cap or the like, adapted to cover the end of a tubular member or vehicle hub, and especially to the means whereby it is retained in position thereon.

One object of this invention is to provide an improved hub cap or closure member for the outer end of tubular hubs of motor vehicles or the like.

Another object is to provide a hub cap or the like for a motor vehicle wheel, which will be economical to manufacture and be readily attachable and detachable.

Still another object is to provide a closure member for the open end of a tubular member, which will cooperate with a part of the tubular member, and thereby be retained in position thereon.

A further object is to provide an improved hub cap for the open end of a tubular hub of the wheel of a vehicle or the like, which will effectively cover and substantially seal the open end thereof while being readily detachable therefrom and as readily attachable thereto.

To these and other ends, the invention consists in the novel features and combinations of parts to be hereinafter described and claimed.

In the accompanying drawing:

Fig. 1 is an end view of a vehicle wheel having a hub and hub cap embodying the features of this invention;

Fig. 2 is a section on line 2—2 of Fig. 1;

Fig. 3 is a section on line 3—3 of Fig. 2;

Fig. 4 is a section similar to that shown in Fig. 2, but illustrating a somewhat modified form of hub cap or closure member;

Fig. 5 is a section on line 5—5 of Fig. 4, and

Fig. 6 is a sectional view of a portion of a hub plate, illustrating a somewhat different form of means for retaining the plate upon the hub.

This invention is disclosed by illustrating it in connection with a motor vehicle wheel, which comprises a rim 10, having a pneumatic tire 11 thereon, wire spokes 12, and a tubular hub 13, the open end of which is covered by a hub plate designated in its entirety by the numeral 14. The tubular hub or member 13 is internally shouldered, being provided adjacent its open end with an axially directed shoulder or abutment 15 which, in this instance, is formed by a radially and inwardly directed flange 16.

The hub or cover plate 14 in the form shown in Figs. 2 and 3, comprises a disk-like member 17, which when made of corrosive metal may be covered by an outer covering of non-corrosive metal, such as brass, by disposing a disk 18 of such metal thereon and crimping the edge 19 thereof, about the peripheral edge 20 of the member 17. The member 17 is provided with an axially disposed flange portion which, in this instance, is struck out from the material of member 17, being interrupted to form a plurality of spaced apart sections 21. Each of the sections 21 is slitted or lanced, as at 22, along a portion of its length intermediate its ends, the slit 22 being spaced from the free edge 23 thereof sufficiently to permit the formation of an outwardly protruding and preferably rounded bump or lug 24, as shown in Figs. 2 and 3, or to permit the positioning of a rivet 25 with its rounded head 26 disposed upon the outer surface of the flange 27, as shown in Fig. 6, between the free edge 23 and the slit 22. Preferably the bump or lug 24 or rivet head 26, is disposed intermediate the ends of the slit 22, and is spaced from the inner end surface 28 of the plate 17, adjacent its peripheral edge an amount to insure that it will engage the shoulder 15 to retain the surface 28 tightly against the outer end of the tubular member 13, when the flanged portion of the plate 17 is inserted therein.

To facilitate the insertion of the flanged portion of the plate 17 into the tubular member or hub 13, and to readily permit its removal therefrom without interfering with the cooperating retaining action of the lugs 24, or rivet heads 26, with the shoulder 15, the material of the flange portion between the slit 22 and the free edge 23 is corrugated or fluted transversely of the flange, as at 29. The corrugated portion 29 of the flange section 21, is of sufficient resiliency to readily permit the bumps or lugs 24, or the rivet heads 26, to move inwardly when this portion is compressed by the insertion of the flange portion of the plate 17 into the tubular member. When the cover plate is in place the corrugated portion expands which causes the lugs 24 to snap into place in engagement with the shoulder 15. Due to the resiliency of the portions 29, reverse operation of these parts is readily permitted when it is desired to remove the cover plate.

The modified form of cover plate shown in Figs. 4 and 5, differs from that shown in Figs. 2 and 3 in that the flange 30 is continuous, being a part of and directed axially from a ring-like edge portion 31, the inwardly directed surface 32 of which is adapted to seat upon the outer end of the tubular member 13. In this form, a disk-like part 33 is disposed with its peripheral edge 34 in engagement with and crimped about the peripheral edge of the ring-like edge portion 31. In this form, the flange 30 is lanced or slitted at spaced intervals thereabout, as at 35, to form sections 36, which may be corrugated as at 37 to provide increased resiliency for these sections. In this construction, as well as that first described, the flanged portion on the cap is provided with a plurality of flexible bow-like parts, each of which is free at the side edges and anchored at both ends to the flange and curved or corrugated in a transverse direction and provided intermediate of its ends with a lug to engage the shoulder adjacent the end of the tubular hub member. The sections 36 being resilient permit the bumps 38 or rivet heads 26 formed in or attached to the sections 36 to move inwardly when the sections 36 are compressed upon the insertion of the flange 30 into the tubular member. By expanding after such insertion the sections cause the lugs to snap into engagement with the shoulder 15 and tightly retain the cover in place.

The above described structure in a cover plate for the open end of a tubular member and particularly in a hub plate for the tubular hub of the wheel of a motor vehicle, provides effective means for covering and substantially sealing the same, and a hub cap or closure member which is economical to manufacture and readily attachable and detachable.

While I have shown and described some preferred embodiments of my invention, it is to be understood that it is not to be limited thereto in all of its details, but is capable of modification and variation which will lie within the spirit of the invention and within the scope of the appended claims.

What I claim is:

1. In combination with a tubular member, having an inwardly directed shoulder disposed within and adjacent an open end thereof, a cover plate for the open end of said member, and an axially extending flange on said cover plate, said flange having flexible means integral therewith and extending therefrom in a generally peripheral direction and which is transversely corrugated to cause it to be laterally contractible to permit the insertion of said flange within said tubular member, and expansible to permit the engagement of said means with said shoulder to retain said cover plate thereon.

2. In combination with a tubular member having an inwardly directly shoulder disposed within and adjacent an open end thereof, a cover plate for the open end of said member and an axially extending flange on said cover plate, said flange being adapted to enter said tubular member and having a flexible bowlike part anchored at both ends to said flange and provided with an outwardly extending lug, and said part being adapted to resiliently urge said lug outwardly into engagement with said shoulder to retain said cover upon said member.

3. A cover plate for the open end of an internally shouldered tubular member, comprising a disk-like member having an axially directed flange thereon adapted to enter said tubular member, said flange having a resilient bowlike portion anchored at both ends to the body of the flange and adapted to compress to permit said flange to enter the tubular member and to expand to engage the member and retain said plate thereon.

4. A cover plate for the open end of an internally shouldered tubular member, comprising a disk-like member having an axially directed flange thereon adapted to enter said tubular member, said flange being slitted at spaced intervals thereabout to form sections defined by the slit and the free edge of said flange, said sections being corrugated to provide resiliency thereto and provided with means extending beyond the periphery of said flange whereby the sections will compress to permit the insertion of said flange into said tubular member and expand to cause the engagement of said means with the shoulder of the tubular member to retain said plate thereto.

5. A cover plate for the open end of a tubular member, comprising a disk-like member having an axially directed flange thereon adapted to enter said tubular member, said flange being slitted at intervals thereabout to form sections defined by the slit and the free edge of said flange, said sections being corrugated to impart resiliency thereto, and means associated with each of said sections and extending beyond the periphery of said flange to engage the tubular member and retain said plate thereon when said flange is inserted therein.

6. A cover plate for the open end of an internally shouldered tubular member, comprising a disk-like member having an axially directed flange thereon adapted to enter said tubular member, said flange being slitted longitudinally thereof at spaced intervals thereabout to form flexible sections, said sections being transversely corrugated to impart resiliency thereto whereby these sections will compress to permit the insertion of said flange into said tubular member and expand to engage with the shoulder of the tubular member to retain said plate thereto.

7. In a hub construction for vehicle wheels, the combination with a tubular hub member having an inwardly directed shoulder disposed within and adjacent the open end thereof, of a cover plate for the open end of said hub member overlying the same, a flange portion on said cover plate extending axially of the latter into said tubular member adjacent said shoulder, a resilient bowlike portion free at both of its side edges but anchored at both of its ends to said flange portion and transversely bent or corrugated so as to have considerable lateral contractibility and expansibility, and a lug on the intermediate part of said bowlike portion normally projecting beyond the line of the flange portion to engage said shoulder and thereby retain said cover plate on said hub member.

8. In a hub construction for vehicle wheels, the combination with a tubular hub member having a substantially annular inwardly directed shoulder disposed within and adjacent the open end of said hub member, of a cover plate for the open end of said hub member overlying the same, an axially extending flange portion on said cover-plate at the inner side thereof extending into the open end of said hub member adjacent said shoulder, and a plurality of flexible bowlike parts located respectively at different points in the periphery of said cover plate and associated with said flange portion, each of said bowlike parts being free at the side edges thereof but anchored at both ends to said flange portion and transversely curved or corrugated to impart resiliency thereto, and a lug at the middle part of each of said bowlike parts normally projecting beyond the line of said flange portion to engage the face of said shoulder, said bowlike parts being laterally contractible to permit the insertion of said flange portion within said hub member and laterally expansible to engage the respective lugs with said shoulder to retain the cover plate in place.

9. In a hub construction for vehicle wheels, the combination of a tubular hub member, a cover-plate for the open end thereof, a flange-like member on said cover-plate, extending axially thereof and adapted to enter said tubular member through the open end thereof, cooperating abutments upon said tubular member and said flange-like member, said abutments extending toward each other and being adapted to interengage, and a part located peripherally of and secured at each end thereof to one of said members, said part carrying one of said abutments and being transversely corrugated to cause the same to be resilient and permit the abutment carried thereby to be depressed while passing the abutment on the other member and to spring back to engage the same to retain said cover-plate upon said tubular member.

10. In a hub construction for vehicle wheels, the combination with a tubular hub member, of a cover-plate for the open end thereof, a flange-like member extending axially from said cover-plate, said tubular member and said flange-like member being adapted to slide, one within the other, one of said members having a shoulder extending toward the other member, and the other member having a resilient bow-like part anchored at both of its ends to said member, said part being transversely bent or corrugated so as to have lateral contractibility and expansibility, and shoulder engaging means on the intermediate portion of said bow-like part and projecting therefrom toward said shoulder when one member is within the other to engage the same and thereby removably retain said cover-plate to said hub member.

11. An automobile hub cap assembly comprising a metal hub open at one end and having a continuous inwardly extending peripheral flange of substantial depth surrounding the opening, a hub cap arranged to be associated with the hub in any circumferential position by a straight line movement, said cap having an axial rigid flange dimensioned to pass through the hub opening, slits in the flange to form resilient portions with the flange member surrounding the slits, and projections associated with the flange and located adjacent but independent of the slits and between the edges of the flange and arranged to snap behind and engage the rear face of the hub flange when the cap is associated with the hub.

In witness whereof, I have hereunto set my hand this 10th day of April, 1929.

GREGORY BROWN.